(12) United States Patent
Nishifukumoto

(10) Patent No.: US 11,283,341 B2
(45) Date of Patent: Mar. 22, 2022

(54) ARMATURE CORE

(71) Applicant: FANUC CORPORATION, Yamanashi (JP)

(72) Inventor: Akira Nishifukumoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 34 days.

(21) Appl. No.: 17/010,544

(22) Filed: Sep. 2, 2020

(65) Prior Publication Data
US 2021/0126516 A1  Apr. 29, 2021

(30) Foreign Application Priority Data

Oct. 29, 2019 (JP) .............................. JP2019-195772

(51) Int. Cl.
*H02K 41/02* (2006.01)

(52) U.S. Cl.
CPC ................................. *H02K 41/02* (2013.01)

(58) Field of Classification Search
CPC ......... H02K 41/03; H02K 7/075; H02K 15/03
USPC .............. 310/12.01, 12.02, 12.12, 12.14, 14, 310/216.83, 216.84
See application file for complete search history.

(56) References Cited

U.S. PATENT DOCUMENTS

| 4,559,511 A * | 12/1985 | Basnett ..................... H01F 7/08 218/140 |
| 8,106,544 B2 * | 1/2012 | Kane ..................... H01F 7/1646 310/12.01 |
| 2005/0140213 A1 * | 6/2005 | Miyamoto ............. H02K 5/225 310/12.01 |

FOREIGN PATENT DOCUMENTS

| JP | 2001145327 A | * | 5/2001 |
| JP | 2011-101551 A | | 5/2011 |

* cited by examiner

*Primary Examiner* — Jose A Gonzalez Quinones
(74) *Attorney, Agent, or Firm* — Studebaker & Brackett PC

(57) ABSTRACT

An armature core of a linear motor, the armature core including: a core body having a plurality of teeth parts around which a winding is wound, and consisting of laminated steel sheets; a block disposed inside of the core body; a fastening hole provided in the block, and through which a fastener is inserted; and a fastener insertion member having a fastener insertion hole, and arrangeable at the core body in a state in which outside of the core body and inside of the fastening hole are in communication via the fastener insertion hole, in which the core body is fixed to a fixing target via the block, by the fastener inserted in the fastener insertion hole being fastened to the block via the fastening hole, and the armature core has a seal structure which, in a state in which the fastener insertion member surrounds an opening part of the fastening hole, blocks passage of fluid from the opening part to outside of the fastener insertion member.

5 Claims, 7 Drawing Sheets

ARMATURE CORE

This application is based on and claims the benefit of priority from Japanese Patent Application No. 2019-195772, filed on 29 Oct. 2019, the content of which is incorporated herein by reference.

FIELD OF THE INVENTION

The present invention relates to an armature core.

RELATED ART

Conventionally, as the core of an armature used in various motors, generators, etc., there is one configured with laminated steel sheets (laminated core) made by laminating a plurality of steel sheets such as silicon steel sheets as a main body. In an armature equipped with this type of armature core, a structure has been known which fixes the laminated core to a mounting plate by providing tap holes in the laminated core constituting the armature for a linear motor, and threading bolts through the mounting plate to the tap holes (for example, refer to Patent Document 1).

Patent Document 1: Japanese Unexamined Patent Application, Publication No. 2011-101551

SUMMARY OF THE INVENTION

However, in this type of armature core, there are cases of being used in a machine tool or the like and being utilized in an environment coming into contact with liquid such as cutting fluid, and if such a liquid infiltrates inside of the armature core (between steel sheets or the like), it influences the performance of the armature and leads to breakdown. For this reason, a structure which suppresses infiltration of liquid to inside of the armature core has been desired.

An armature core according to an aspect of the present disclosure includes: a core body having a plurality of teeth parts around which a winding is wound, and consisting of laminated steel sheets; a block disposed inside of the core body; a fastening hole provided in the block, and through which a fastener is inserted; and a fastener insertion member having a fastener insertion hole, and arrangeable at the core body in a state in which outside of the core body and inside of the fastening hole are in communication via the fastener insertion hole, in which the core body is fixed to a fixing target via the block, by the fastener inserted in the fastener insertion hole being fastened to the block via the fastening hole, and the armature core has a seal structure which, in a state in which the fastener insertion member surrounds an opening part of the fastening hole, blocks passage of fluid from the opening part to outside of the fastener insertion member.

According to an aspect, it is possible to suppress infiltration of liquid to the inside of an armature core.

DETAILED DESCRIPTION OF THE INVENTION

Hereinafter, embodiments of the present disclosure will be explained using the drawings.

First Embodiment

Figure 1:
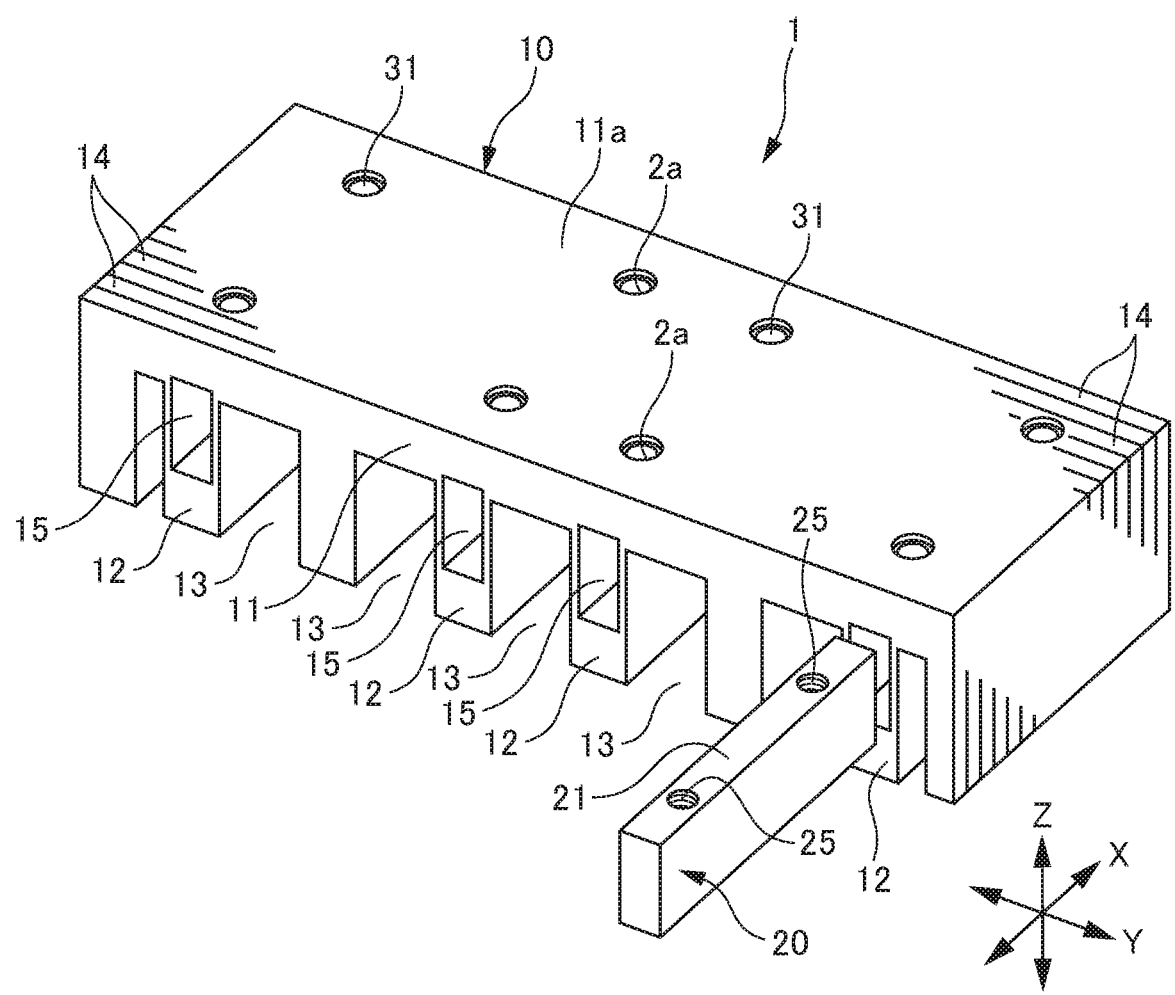
FIG. 1 is a perspective view of an armature core according to a first embodiment of the present disclosure.
Figure 2:
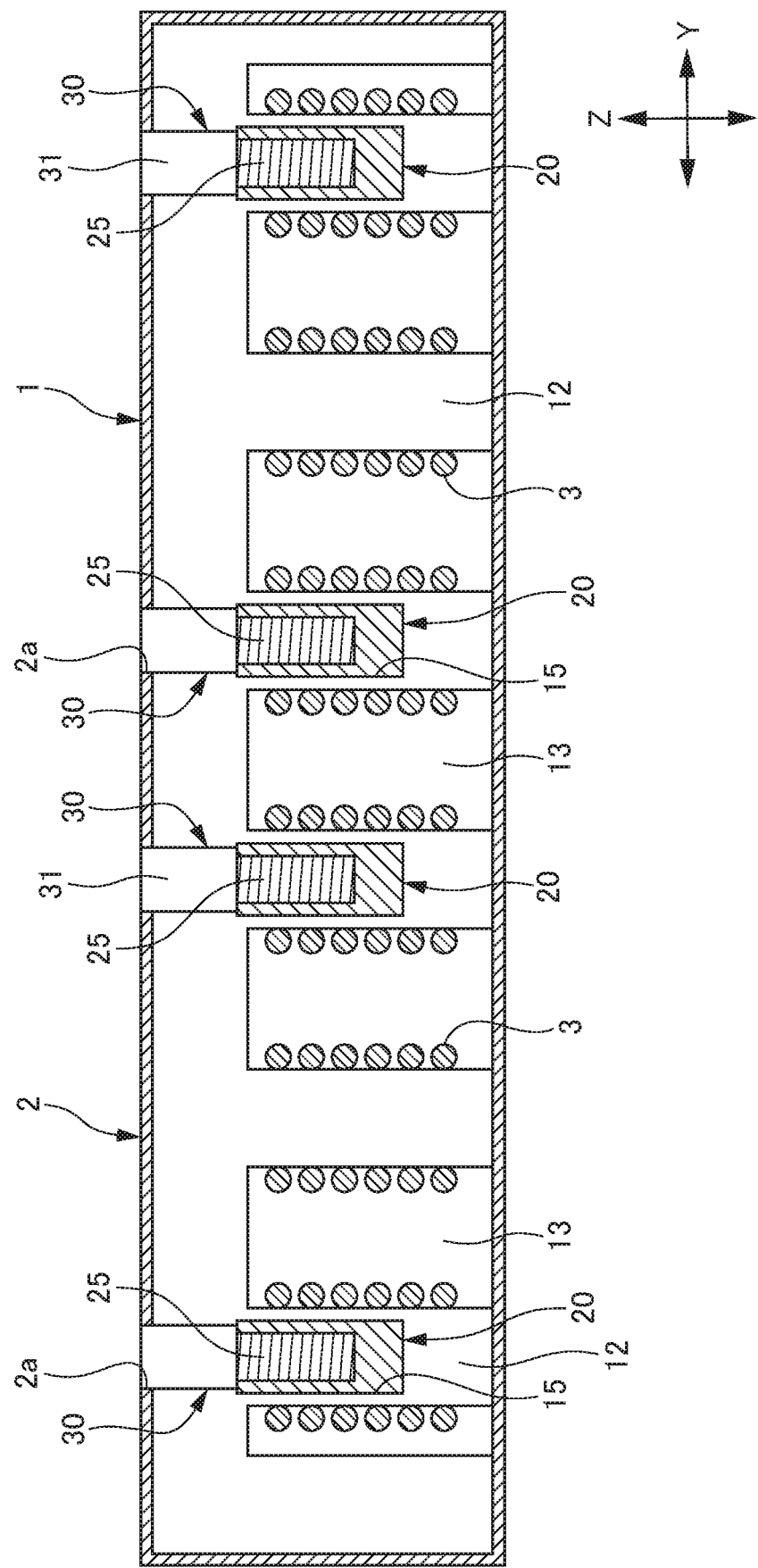
FIG. 2 is a longitudinal section showing an aspect of the armature core of the first embodiment being covered by a cover.

FIG. 1 shows an armature core 1 for a linear motor according to a first embodiment. The armature core 1 is used in a state in which the entire surface is covered by a cover 2 consisting of metal thin sheets such as stainless steel sheets, as shown in FIG. 2. The cover 2 is provided to the armature core 1 in order to prevent liquid such as cutting fluid from contacting the armature core 1. The cover 2 has a hole 2a exposing to the outside a threaded insertion hole 31 at a location corresponding to the threaded insertion hole 31 described later.

Figure 3:
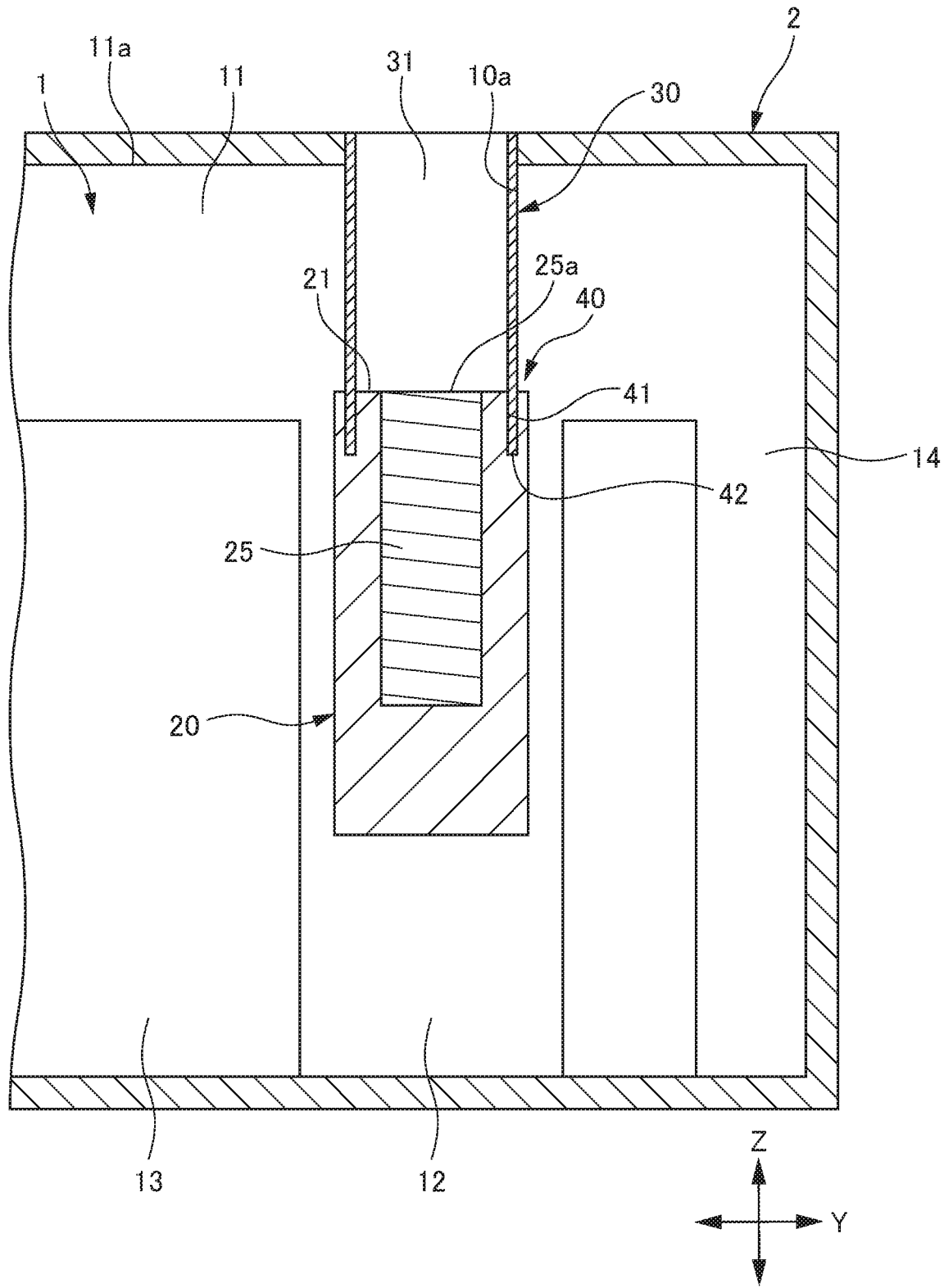
FIG. 3 is a longitudinal section showing a seal structure of the first embodiment.

As shown in FIGS. 1 and 2, the armature core 1 includes: a core body 10, a plurality of blocks 20 arranged inside of the core body 10, a female threaded hole 25 provided in the block 20, and a threaded insertion member 30 provided to the core body 10. In addition, the armature core 1 includes a seal structure 40, as shown in FIG. 3.

The core body 10 has a rectangular plate part 11, and a plurality of teeth parts 12 which are parallel to each other projecting from a side of the plate part 11. The plurality of teeth parts 12 projects in the Z direction shown in FIG. 1, extends in the X direction and Z direction (following the X-Z plane), and is parallel to the Y direction. The core body 10 has a groove 13 between the plurality of teeth parts 12. As shown in FIG. 2, a winding 3 arranged to straddle the adjacent grooves 13 is wound around the teeth parts 12. It should be noted that the directions of the coordinate axes indicated by X, Y and Z shown in FIG. 2 and later correspond to FIG. 1.

As shown in FIG. 1, the core body 10 consists of laminated steel sheets made by a plurality of comb-shaped steel sheets 14 being laminated in the X direction of FIG. 1. As the steel sheets 14, a thin sheet made of electromagnetic steel such as silicon steel can be used. The steel sheets 14 have a predetermined magnetic pole form, and constitute the core body 10 by being laminated with in the same form.

A block 20 is configured in a rectangular parallelepiped shape from metal. The block 20 is inside of the core body 10, and is embedded in a root portion of the plurality of teeth parts 12 at a location sufficiently separated among the plurality of teeth parts 12. One of the reasons for the block 20 being embedded in the root portion of the teeth part 12 is to curb the size (particularly the size in the Z direction) of the core body 10. In the present embodiment as shown in FIG. 2, four total blocks 20 are used. One block is used at each end in the longitudinal direction (Y direction in FIG. 1)

of the core body 10 and two blocks are used at the central portion. The block 20 is arranged inside a through hole 15 piercing the laminating direction (X direction) of the steel sheet 14 provided to the core body 10. The block 20 is fixedly installed by a means such as bonding to the core body 10. It should be noted that the number of blocks 20 is not limited to four, and is set arbitrarily according to the design requirements, etc.

As shown in FIG. 3, the axial direction of the female threaded hole 25 extends in the Z direction. The female threaded hole 25 constitutes an example of a fastening hole of the present disclosure. The female threaded hole 25 is provided to the block 20 in a state opening at a surface 21 on a side of a late part 11 of the block 20. The female threaded hole 25 has an opening part 25a which opens at the surface 21. A male threaded part 61 of a male threaded member 60 described later is threaded together and fastened to the female threaded hole 25 from the opening part 25a. Two of the female threaded holes 25 are provided at a predetermined interval in the longitudinal direction (X direction in FIG. 1) of the block 20 in the present embodiment. It should be noted that the number of female threaded holes 25 is not limited, and is arbitrarily set according to the design requirements, etc.

As shown in FIG. 3, the threaded insertion member 30 is a member of cylindrical shape in which the axial direction thereof extends in the Z direction. The threaded insertion member 30 has a threaded insertion hole 31 inside thereof. The threaded insertion member 30 constitutes an example of a fastener insertion member of the present disclosure. The threaded insertion hole 31 constitutes an example of a fastener insertion hole of the present disclosure. The threaded insertion member 30 is fitted in a substantially concentric manner with the female threaded hole 25, in a fitting hole 10a provided in the core body 10 corresponding to each female threaded hole 25. The fitting hole 10a penetrates the outside of a surface 11a side of the plate part 11 of the core body 10 and the inside of the female threaded hole 25. In the threaded insertion member 30 of cylindrical shape, the outside diameter is somewhat smaller than the width dimension (length in Y direction in FIG. 3) of the block 20, and the inside diameter (inside diameter of threaded insertion hole 31) is larger than the inside diameter of the female threaded hole 25. The threaded insertion member 30 surrounds the opening part 25a of the female threaded hole 25.

As shown in FIG. 3, the seal structure 40 has a groove part 41 provided in the block 20, and has a fitting part 42 which is provided to the threaded insertion member 30 and fits with the groove part 41. The groove part 41 is a slit of cylindrical shape (annular bottom groove), and is provided in the surface 21 of the block 20. The fitting part 42 is configured at an end of a side of the threaded insertion member 30 opposing the block 20. The fitting part 42 is press fitted to the groove part 41, for example, and is fitted in a state closely contacting the inner circumferential face and outer circumferential face of the groove part 41. The seal structure 40 blocks the passage of liquid from the opening part 25a to the outer circumferential side of the threaded insertion member 30, in a state in which the threaded insertion member 30 surrounds the opening part 25a of the female threaded hole 25. It should be noted that the liquid may inevitably pass through if designing so as to block the passage of liquid.

The threaded insertion member 30 is formed from metal, resin or the like. In the case of the threaded insertion member 30 being made of resin, it is possible to manufacture the threaded insertion member 30 by injection molding. In addition, the threaded insertion member 30 may be integrally molded with the core body 10 by insert molding resin into the fitting hole 10a. In the case of performing insert molding, a piece made by installing the block 20 in the core body 10 is set inside of a molding mold, and resin is injecting into the fitting hole 10a and groove part 41, to mold the threaded insertion member 30 and seal structure 40 together with the fitting part 42 inside of the groove part 41. In the case of molding the threaded insertion member 30 by insert molding, since a plurality of the threaded insertion members 30 can be simultaneously provided to the core body 10, there is an advantage in that an improvement in productivity is achieved.

Figure 4:
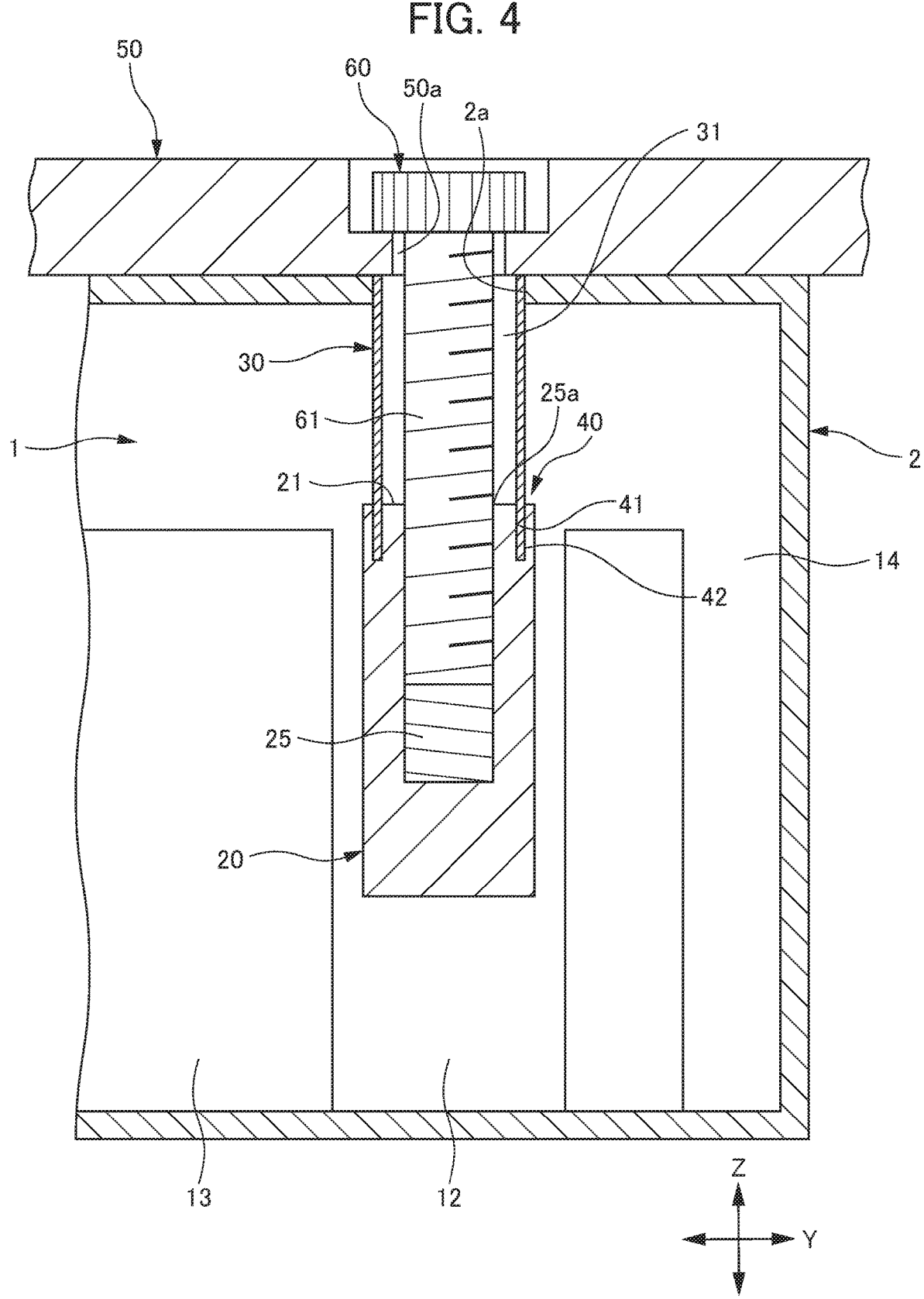
FIG. 4 is a longitudinal section showing a state in which the armature core of the first embodiment is fixed to a mounting plate.

The armature core 1 is fixed by a male threaded member 60 such as a bolt to the mounting plate 50 provided movably along the feed axis (not shown) of a machine tool or the like, as shown in FIG. 4, for example. The mounting plate 50 constitutes an example of a fixing target of the present disclosure. The armature core 1 is fixed to the mounting plate 50 via the block 20, by the male threaded part 61 of the male threaded member 60 having passed through the mounting hole 50a of the mounting plate 50 then threading with the female threaded hole 25 from the opening part 25a of the female threaded hole 25 in the block 20 via the threaded insertion hole 31 to be fastened. The armature core 1 is combined with a field magnetic pole (not shown) arranged on a side of the teeth part 12 to constitute a linear motor. This linear motor linearly drives the armature core 1 in the Y direction in FIG. 1.

The armature core 1 according to the first embodiment of the present disclosure includes: the core body 10 having a plurality of teeth parts 12 around which the winding 3 is wound and consisting of laminated steel sheets; the block 20 arranged inside of the core body 10; the female threaded hole 25 provided in the block 20; and the threaded insertion member 30 having the threaded insertion hole 31, and which is arrangeable at the core body 10 in a state in which the outside of the core body 10 and inside of the female threaded hole 25 are in communication via the threaded insertion hole 31; and the core body 10 is fixed to the mounting plate 50 via the block 20 by the male threaded part 61 of the male threaded member 60 threading and being fastened to the female threaded hole 25 via the threaded insertion hole 31. The armature core 1 has a seal structure 10 which blocks passage of liquid from the opening part 25a to the outer circumference side of the threaded insertion member 30, in a state in which the threaded insertion member 30 surrounds the opening part 25a of the female threaded hole 25.

In the armature core 1 of the first embodiment, in a case of a situation such that the armature core 1 makes contact with liquid such as oil or cutting fluid used in a machine tool, for example, such a liquid (hereinafter simply referred as "liquid") is mostly prevented from infiltrating to the armature core 1 by the cover 2. However, in addition thereto, liquid penetrating to inside of the cover 2 from a hole 2a in the cover 2 is present. The liquid having penetrated to inside of the cover 2 from the hole 2a in the cover 2 enters the threaded insertion hole 31 and reaches the surrounding of the opening part 25a of the block 20 (surrounding of male threaded part 61). For this liquid, the passage to the outer circumference side of the threaded insertion member 30 is blocked by the seal structure 40. In other words, by the fitting part 42 of the threaded insertion member 30 fitting with the groove part 41, liquid is blocked from passing from the inside of the threaded insertion member 30 to the outer circumference side.

Therefore, on the inside of the threaded insertion member 30, the liquid collects at the circumference of the opening part 25a of the block 20, or penetrates to the female threaded hole 25, whereby penetration of liquid to inside of the core body 10 (between steel sheets 14, etc.) is suppressed. As a result thereof, the occurrence of defects such as a decline in performance of the linear motor and breakdown due to infiltration of liquid to the armature core 1 is suppressed.

Next, second and third embodiments of the present disclosure will be explained while citing the above-mentioned explanation of the first embodiment. It should be noted that, in the following explanation, the same reference symbols are attached to constituent elements which are the same as the above first embodiment, explanations thereof will be omitted or abbreviated, and points of difference will be explained mainly.

Second Embodiment

Figure 5:
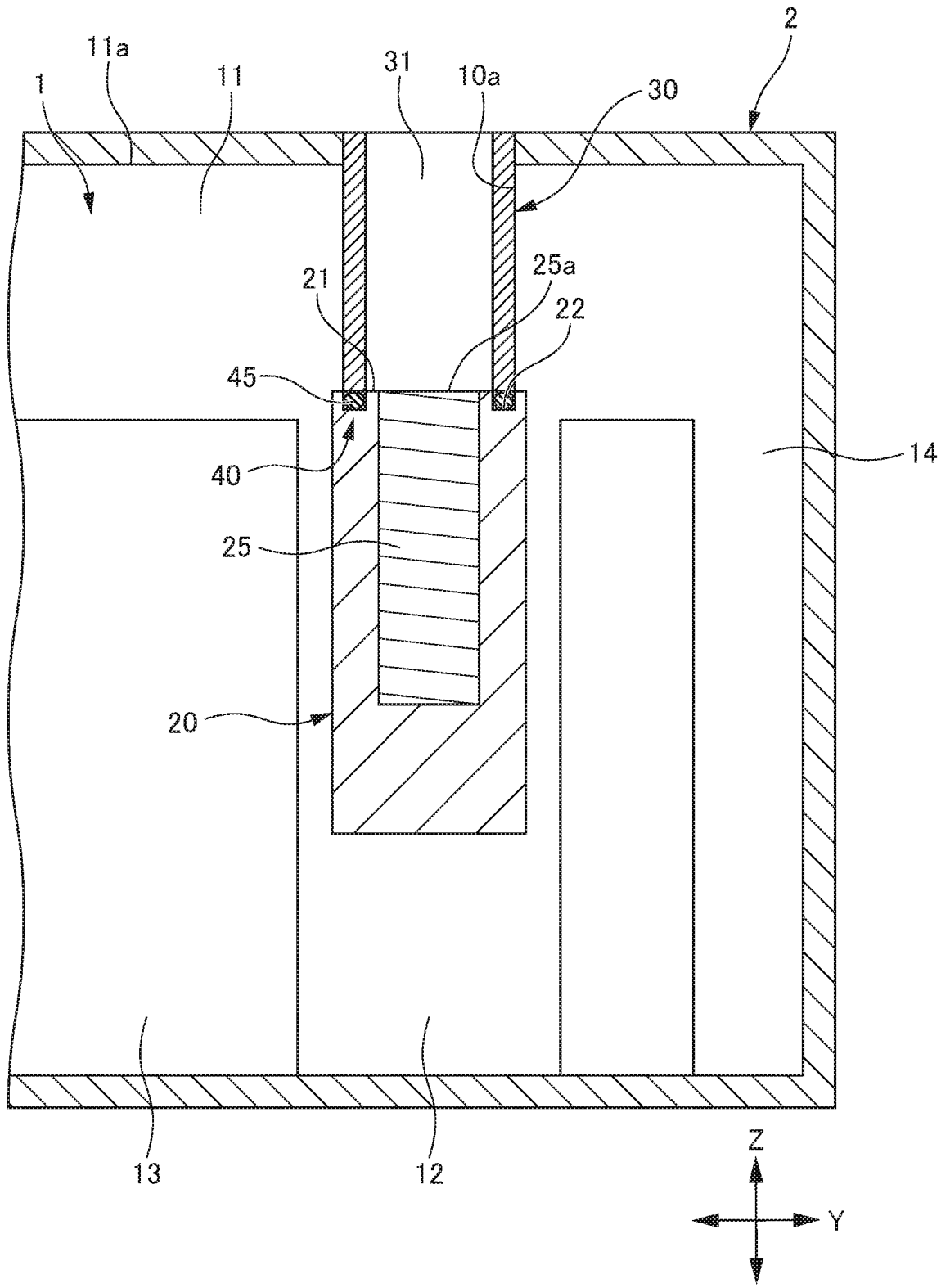
FIG. 5 is a longitudinal section showing a seal structure according to a second embodiment of the present disclosure.

FIG. 5 shows a seal structure 40 according to a second embodiment. The seal structure 40 of the second embodiment has a seal member 45 provided between the block 20 and threaded insertion member 30. The seal member 45 is an annular member consisting of an elastic member such as rubber, and is provided to fit in a circumferential groove 22 provided in the surface 21 of the block 20. An annular end face opposing the block 20 of the threaded insertion member 30 is pressure welded in a state in which pressure of a certain magnitude is applied to the seal member 45. The seal member 45 is thereby fitted inside of the circumferential Groove 22 in a state somewhat crushed.

According to the second embodiment, the liquid is blocked from passing from the inside of the threaded insertion member 30 to the outer circumference side by the seal member 45. Similarly to the first embodiment, the infiltration of liquid to inside of the core body 10 (between steel sheets 14, etc.) is suppressed, a result of which the occurrence of defects such as a decline in performance of the linear motor and breakdown due to infiltration of Liquid to the armature core 1 is suppressed.

Third Embodiment

Figure 6:
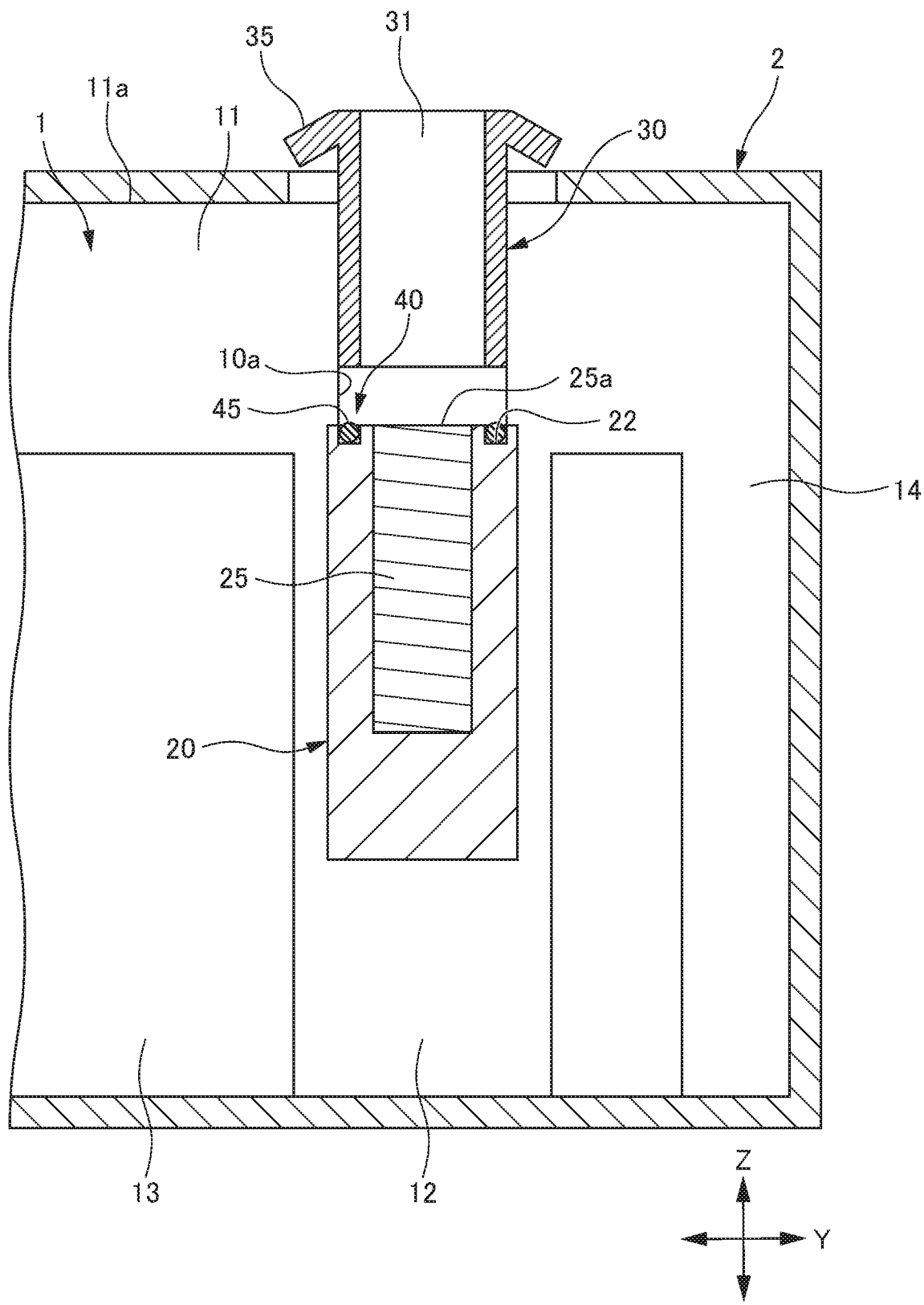
FIG. 6 is a longitudinal section showing a third embodiment of the present disclosure provided with a flange part in a threaded insertion member of the second embodiment, showing a state in the middle of mounting the threaded insertion member to a core body.
Figure 7:
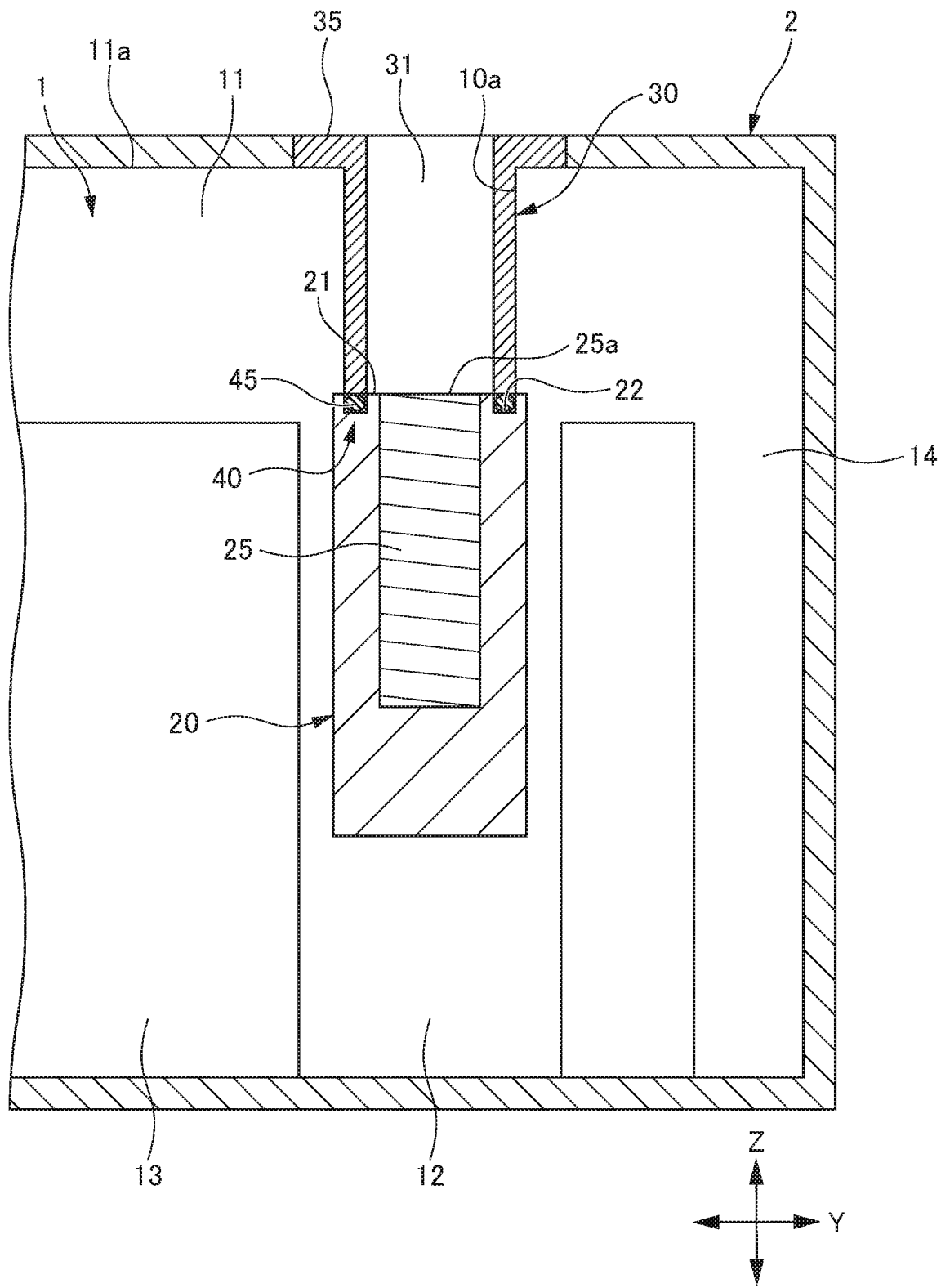
FIG. 7 is a longitudinal section showing a state mounting a threaded insertion member of the third embodiment to a core body.

FIGS. 6 and 7 show a third embodiment in which a flange part 35 is added to the threaded insertion member 30 of the above second embodiment.

The flange part 35 is provided at an end on the outer side of the threaded insertion member 30, i.e. end on the opposite side to the block 20. FIG. 6 shows a state in which the flange part 35 is fitted up to the middle in the fitting hole 10a of the core body 10. As shown in FIG. 6, the flange part 35 is formed to curve in a state sloping to the inside in the axial direction (downwards in FIG. 6) of the threaded insertion hole 31, in a free state. Then, when the threaded insertion member 30 is fitted in the fitting hole 10a in a state making pressure contact with the seal member 45 as shown in FIG. 7, the flange part 35 elastically deforms to elastically closely contact the surface 11a of the plate part 11 of the core body 10. In this state, the flange part 35 extends in a direction substantially orthogonal to the axial direction (Z direction in FIG. 7) of the threaded insertion hole 31. The threaded insertion member 30, upon fixing the armature core 1 to the mounting plate 50 as shown in FIG. 4, can be made to fit to the fitting hole 10a, by pressing via the mounting plate 50.

According to the third embodiment, infiltration of liquid to the fitting hole 10a to which the threaded insertion member 30 is fitted is suppressed by the flange part 35. Therefore, it becomes possible to even further suppress infiltration of liquid to inside of the core body 10 (between steel sheets 14, etc.).

The seal structure of the present disclosure is not limited to the seal structure 40 of the above first to third embodiments, and may be any form so long as being a configuration which blocks passage of liquid from the opening part 25a to the outer circumference side of the threaded insertion member 30, in a state in which the threaded insertion member 30 surrounds the opening part 25a of the female threaded hole 25. In each of the above embodiments, by fastening the male threaded member 60 to the block 20, the core body 10 is fixed to the mounting plate 50 via the block 20; however, the fastener of the present disclosure fastened to the block 20 is not limited to the male threaded member 60. The fastener of the present disclosure may be any form, so long as the core body 10 is fixed to the mounting plate 50 via the block 20, by being fastened to the block 20.

EXPLANATION OF REFERENCE NUMERALS 1 armature core
3 winding
10 core body
12 teeth part
20 block
25 female threaded hole (fastening hole)
25a opening part
30 threaded insertion member (fastener insertion member)
31 threaded insertion hole (fastener insertion hole)
35 flange part
40 seal structure
41 groove part
42 fitting part
45 seal member
50 mounting plate (fixing target)
60 male threaded member (fastener)
61 male threaded part

What is claimed is:

1. An armature core of a linear motor, comprising:
a core body having a plurality of teeth parts around which a winding is wound, and consisting of laminated steel sheets;
a block disposed inside of the core body;
a fastening hole provided in the block, and through which a fastener is inserted; and
a fastener insertion member having a fastener insertion hole, and arrangeable at the core body in a state in which outside of the core body and inside of the fastening hole are in communication via the fastener insertion hole,
wherein the core body is fixed to a fixing target via the block, by the fastener inserted in the fastener insertion hole being fastened to the block via the fastening hole, and
wherein the armature core has a seal structure which, in a state in which the fastener insertion member surrounds an opening part of the fastening hole, blocks passage of fluid from the opening part to outside of the fastener insertion member.

2. The armature core of a linear motor according to claim 1, wherein the seal structure includes: a groove part provided in the block; and a fitting part which is provided to the fastener insertion member and fits to the groove part.

3. The armature core of a linear motor according to claim 1, wherein the seal structure includes a seal member provided between the block and the fastener insertion member.

4. The armature core of a linear motor according to claim 1, wherein the fastener insertion member has a flange part which extends from an end on an opposite side to the block in a direction substantially orthogonal to an axial direction of the fastener insertion hole.

5. The armature core of a linear motor according to claim 1, wherein the fastener is a male threaded member having a male threaded part, and the fastening hole is a female threaded hole to which the male threaded part is fastened.

* * * * *